(12) United States Patent
Rost et al.

(10) Patent No.: US 9,094,959 B2
(45) Date of Patent: Jul. 28, 2015

(54) COMMUNICATION NETWORK AND METHOD FOR OPERATING A COMMUNICATION NETWORK

(75) Inventors: Peter Rost, Dresden (DE); Andreas Maeder, Heidelberg (DE); Xavier Perez Costa, Heidelberg (DE)

(73) Assignee: NEC EUROPE LTD., Heidelberg (DE)

( * ) Notice: Subject to any disclaimer, the term of this patent is extended or adjusted under 35 U.S.C. 154(b) by 206 days.

(21) Appl. No.: 13/814,789

(22) PCT Filed: Aug. 24, 2010

(86) PCT No.: PCT/EP2010/005176
§ 371 (c)(1),
(2), (4) Date: Feb. 7, 2013

(87) PCT Pub. No.: WO2012/025131
PCT Pub. Date: Mar. 1, 2012

(65) Prior Publication Data
US 2013/0136113 A1    May 30, 2013

(51) Int. Cl.
| | |
|---|---|
| *H04W 72/00* | (2009.01) |
| *H04W 72/04* | (2009.01) |
| *H04L 5/00* | (2006.01) |
| *H04L 27/26* | (2006.01) |

(52) U.S. Cl.
CPC ......... *H04W 72/0406* (2013.01); *H04L 5/0007* (2013.01); *H04L 5/008* (2013.01); *H04L 5/0041* (2013.01); *H04L 5/0064* (2013.01); *H04L 27/265* (2013.01)

(58) Field of Classification Search
None
See application file for complete search history.

(56) References Cited

U.S. PATENT DOCUMENTS

| | | | | |
|---|---|---|---|---|
| 5,192,982 A | * | 3/1993 | Lapucci | ........................ 356/520 |
| 5,790,516 A | * | 8/1998 | Gudmundson et al. | ....... 370/210 |
| 5,909,123 A | | 6/1999 | Budnaitis | |

(Continued)

FOREIGN PATENT DOCUMENTS

| | | |
|---|---|---|
| EP | 1 845 677 | 10/2007 |
| JP | 2001-156741 | 6/2001 |

(Continued)

OTHER PUBLICATIONS

International Search Report dated May 19, 2011, corresponding to PCT/EP2010/005176.

*Primary Examiner* — Chi H Pham
*Assistant Examiner* — Shick Hom
(74) *Attorney, Agent, or Firm* — Young & Thompson

(57) ABSTRACT

A communication network, wherein the network includes a plurality of communication elements that function as transmitters and/or receivers, in particular base stations and operating nodes being associated to at least one of the base stations, wherein the communication between the transmitters and the receivers is performed by way of generating and transmitting signals based on a multi-carrier modulation with a number of N subcarriers around a carrier frequency $f_c$, is characterized in that the communication elements are configured to perform, upon receiving a transmitted signal, a subsampling of the received signal, wherein only a predetermined number of the inner-most subcarriers around the carrier frequency $f_c$ are employed for data reconstruction. Furthermore, a respective method for operating a communication network is described.

19 Claims, 6 Drawing Sheets

(56) References Cited

Figure 1:
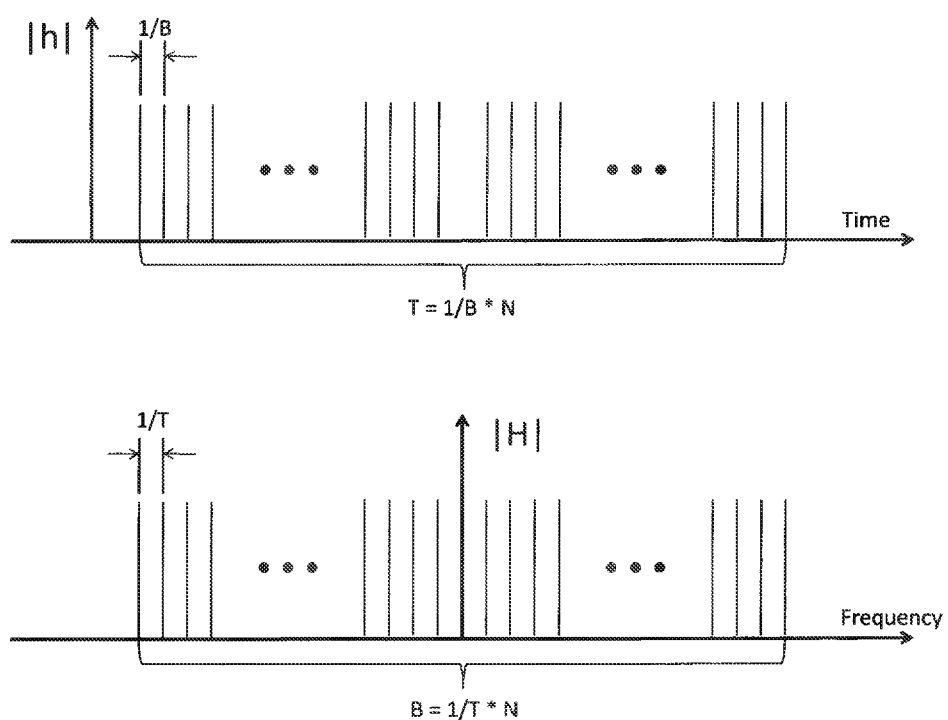

U.S. PATENT DOCUMENTS 7,639,639 B2 * 12/2009 Herdin .................. 370/315
7,660,370 B2    2/2010 Honda et al.

FOREIGN PATENT DOCUMENTS

JP    2003-283455    10/2003
JP    2007-259326    10/2007

* cited by examiner

COMMUNICATION NETWORK AND METHOD FOR OPERATING A COMMUNICATION NETWORK

BACKGROUND OF THE INVENTION

The present invention relates to a communication network as well as to a method for operating a communication network, wherein said network includes a plurality of communication elements that function as transmitters and/or receivers, in particular base stations and operating nodes being associated to at least one of said base stations, wherein the communication between said transmitters and said receivers is performed by way of generating and transmitting signals based on a multi-carrier modulation with a number of N subcarriers around a carrier frequency $f_c$.

DESCRIPTION OF THE RELATED ART

Modern communication networks, like for instance next generation mobile radio networks (MRNs), will have to support an increasing number of energy-limited nodes such as autonomously (and possibly even energy-autarkic) operating nodes. In the following, these kind of operating nodes, in order to distinguish them from "conventional" mobile communication nodes, are referred to as M2M (machine-to-machine) nodes. Due to the fact that MRNs must support both communication to such energy-limited M2M nodes and "conventional" services, it will be most likely that both services share the same spectral resources, since it is not cost-efficient to have separate spectral resources for conventional and M2M communication. The resources will be assigned depending on load, QoS, and other measures.

A major part of M2M services requires M2M nodes performing tasks of low complexity, for instance, temperature or other environmental measurements, and to report the results from time to time. Basically, such M2M nodes are mostly autonomously acting over a long period of time (months or even years) without external power supply or using only regenerative power-sources (such as solar and heat power). This implies the evident need for highly energy-efficient receiver hardware. Currently deployed systems are underlying QoS requirements and are designed to support mobile terminals, which provide a high-data-rate user interface. This changes for M2M communication as most such nodes are non-mobile (movable but not mobile), autonomously deliver data (probably based on a regular schedule), require low-priority and low-data-rate services, and might exploit the existing resources more sporadically. Therefore, the system interface provided by currently deployed systems will most likely not satisfy the demands of M2M communication.

SUMMARY OF THE INVENTION

It is therefore an object of the present invention to improve and further develop a communication network as well as a method for operating a communication network of the initially specified type in such a way that receivers with different capabilities and/or complexity requirements can operate using resources and specifications of the same system in an energy-efficient fashion.

In accordance with the invention, the aforementioned object is accomplished by a communication network comprising the features of claim 1. According to this claim, such a network is characterized in that said communication elements are configured to perform, upon receiving a transmitted signal, a sub-sampling of the received signal, wherein only a predetermined number of the inner-most subcarriers around said carrier frequency $f_c$ are employed for data reconstruction.

Furthermore, the above mentioned object is accomplished by a method comprising the features of claim 21. According to this claim, such a method is characterized in that said communication elements perform, upon receiving a transmitted signal, a sub-sampling of the received signal, wherein only a predetermined number of the inner-most subcarriers around said carrier frequency $f_c$ are employed for data reconstruction.

According to the invention it has been recognized that the requirement to support both M2M and conventional services within the same spectrum implies that existing systems must be changed. Since very fast switches between M2M and conventional services are required, it appears to be preferable to have one system operating within one spectrum, which is able to support both M2M and conventional services. To this end the present invention proposes a configuration according to which communication elements, when they receive a transmitted signal, do not obtain a sample over the entire subcarriers, but perform a (temporal) sub-sampling of the received signal. More specifically, only a predetermined number of the inner-most subcarriers around the carrier frequency are acquired and employed for data reconstruction.

The hierarchical approach according to the present invention allows for a multitude of terminals with different requirements on the detector and decoder complexity, which linearly increase with the number of time samples. In addition, it is important to note that the analog-to-digital conversion (ADC) as well as the Fast-Fourier-Transform (FFT) consume a major part of the receiver energy. Since according to the invention the receiver requires only a subset of all available time samples of the N-length multi-carrier signal, the complexity related to ADC and FFT will be drastically reduced. Thus, by applying an intentional sub-sampling of the received signal, a super-linear complexity reduction at the receiver compared to conventional receivers using all available subcarriers within the multi-carrier system is achieved.

According to a preferred embodiment the multi-carrier modulation may be implemented in form of an Orthogonal Frequency Division Multiplex Access (OFDMA). For instance, such OFDMA system may have a bandwidth B and a symbol length T, where subcarriers are placed within a frequency distance of 1/T between each other. The spacing 1/T is referred to in the following as subcarrier spacing. In such a system overall N=BT subcarriers are available, for instance, in case of WiMAX N is typically of size 1024 or 2048 (at 10 MHZ and 20 MHz). However, application to other multi-carrier systems such as 3GPP LTE, IEEE 802.11, where parameters T, B, and N might be different, is also possible.

According to a favorable embodiment the employed frequency band may be partitioned into a predetermined number K of classes, which in the following are referred to as receiver classes. Each receiver class $1<k<K$ may be configured in such a way that it spans a number k of the inner-most subcarriers $M_k$ around the carrier frequency $f_c$. As a consequence, in such a hierarchical organization of the frequency band it holds that $M_1<M_2<\ldots<M_K$.

Based on the hierarchical organization of the frequency band and partition into different receiver classes as described above, it may be further provided that each of the receiver terminals operates in a specific receiver class k. For instance, each receiver terminal belonging to class k may be configured to only obtain overall $M_k$ samples, i.e., it only acquires every $N/M_K$-th sample of the transmitted signal. These $M_K$ samples may be used to reconstruct the first $M_K$ subcarriers of the frequency domain signal. This is possible as the vector of time samples obtained in steps of $N/M_K$ possible time samples suffices to reconstruct the inner-most $M_K$ subcarriers. In case of OFDMA it only has to be assured that the transmitted signal is sampled at least every 1/B (B refers to the bandwidth) in order to fulfill the orthogonality constrains of OFDM.

With respect to a functional operation of the system it may be provided that each receiver informs possible transmitters located in its coverage area of the specific receiver class in which it operates. For instance, it may be provided that a node, upon association to a base station, informs the base station of the specific class in which it operates. According to a specific embodiment this information may be provided in form of a class ID. However, as will be apparent to a skilled person other implementations are also possible. For instance, in a system with only two different classes the deployment of a simple flag may be favorable.

In order to enable transmitters to provide an optimum support of different receiver classes, it may be provided that the transmitters accommodate the different receiver classes in their scheduling algorithms. Based on this information transmitters are enabled to adapt their transmission characteristics, for instance by restricting assignment of resources to specific subcarriers or by avoiding the spreading of logical subcarriers over the complete frequency spectrum. In addition, transmitters' scheduling algorithms may be configured to consider long-term objectives and requirements. For instance, a receiver terminal, which can cope with high latency and high delays, needs not to be scheduled during high-traffic times. This means that e.g. metering data during daytimes should be avoided as far as possible, since the available bandwidth will be required to satisfy high-data-rate demands of e.g. cell phone users.

According to still another preferred embodiment it may be provided that operating nodes are grouped depending on their complexity and/or capabilities, wherein the operating nodes of a specific group operate by using a specific receiver class. Such implementation would allow to integrate these groups into an existing system without harmonizing the existing standard or using non-standard methods (for instance with respect to modulation, coding, etc). Consequently, grouping of terminals according to their individual complexity/capability is a flexible approach to accommodate different terminal classes.

In a specific embodiment only two classes may be realized, i.e. the employed frequency band may be partitioned into two receiver classes, referred to as receiver classes 0 and 1. A higher number of classes would achieve a higher granularity, i.e. a finer adaptation to different receiver complexities; however, this advantage would come at the costs of higher administration efforts with increased signaling overhead.

In the case of two receiver classes it may be provided that a first of the two classes—receiver class 0—is employed by energy-limited M2M operating nodes, wherein a second of the two classes—receiver class 1—is employed by other ("conventional") mobile communication nodes (in particular with QoS requirements). More specifically, it may be provided that the energy-limited M2M operating nodes of receiver class are configured to perform a sub-sampling of received signals by acquiring only e.g. every 8-th or 16-th sample of a transmitted signal. On the other hand, "conventional" mobile communication nodes with QoS requirements, which are much more complex than M2M operating nodes and which provide enhanced capabilities and have less stringent requirements on battery and processing power, may be configured to acquire each sample of a transmitted signal.

Sub-sampling of the inner-most $M_k$ subcarriers may imply an aliasing effect causing interference to the inner-most $M_k$ subcarriers. An effective means for avoiding or at least reducing inter-carrier interference caused by aliasing is low-pass filtering. For instance, it may be provided that each receiver of class k applies a low-pass filter in order to suppress interference to the first $M_k$ subcarriers and originating from aliasing, which otherwise would limit the maximum performance.

Alternatively or additionally to the application of a low-pass filter at the receiver side, various measures can be taken at the transmitter side to reduce aliasing effects. For instance, it may be provided that the transmitters perform a pre-coding of transmitted signals in such a way that the expected interference is shaped. An appropriate mechanism for performing such pre-coding is described in M. Costa (May 1983), "Writing on dirty paper", IEEE Trans. Information Theory 29: 439-441, the disclosure of which is incorporated herein by way of reference. Furthermore, mechanisms for realizing an appropriate scheduling may be applied, e.g. by placing free resources onto those subcarriers where the low-pass filter does not provide the required interference suppression. In addition or alternatively guard intervals and power control techniques may be applied. For instance, information for receivers that are located close to a transmitter may be placed onto subcarriers within the region of insufficient interference-suppression of the low-pass filter, and the respective power for transmitting that information may be decreased. The respective method or methods that are employed in a specific situation, highly depends on the respective scenario. For example, during high-traffic times it is preferable to not use guard intervals, while they are of interest in case a system is not fully loaded.

With respect to achieving operational consistency it proves to be favorable to hierarchically organize signaling and/or control information. This means that signaling and/or controlling information and data within each receiver class are consistent in the sense that receiver class k can fully operate without information transmitted in resources not included in that receiver class. This kind of organizing signaling and/or control information is referred to as in-band-signaling. It is important to note that each receiver class can support an increasing set of functions with increasing index k. Since most nodes, in particular M2M operating nodes, are able to work with a very limited set of functions, it is possible to place signaling information, e.g. related to handover management that is not of major significance for each M2M operating node, onto subcarriers that are more outward and that are thus not acquired by nodes operating in low receiver classes.

On the other hand it is possible that a transmitter transmits signaling and/or control information in one or more subcarriers that are outside the lowest existing receiver class. In this regard, the receiver classes indicated by any of the operating nodes associated to a base station may be taken as reference, for example. This kind of signaling is referred to as out-band-signaling. However, sending parts or the whole signaling in subcarriers that are outside of the current selected class, implies that receivers of the respective receiver class support higher sampling rates in order to correctly receive and demodulate a broader carrier spectrum, which leads to higher hardware costs. Preferably, out-band-signaling data is transmitted in a TDMA (Time Division Multiple Access) manner, such that a receiver terminal operating in a low receiver class, e.g. an M2M device, is enabled to switch between higher and lower sampling rates at predefined or signaled time instances. The benefit of lower energy consumption is therefore maintained, but it is not as high as in an in-band signaling system. This approach would allow integrating low-sampling M2M receiver classes into existing or emerging technologies like IEEE 802.16m, LTE (Long Term Evolution) and LTE-Advanced. Generally it is to be noted that combinations of out-band- and in-band-signaling are possible with the objective to send as less as possible data out-band in order to decrease energy consumption as much as possible.

BRIEF DESCRIPTION OF THE DRAWING FIGURES

Figure 2:
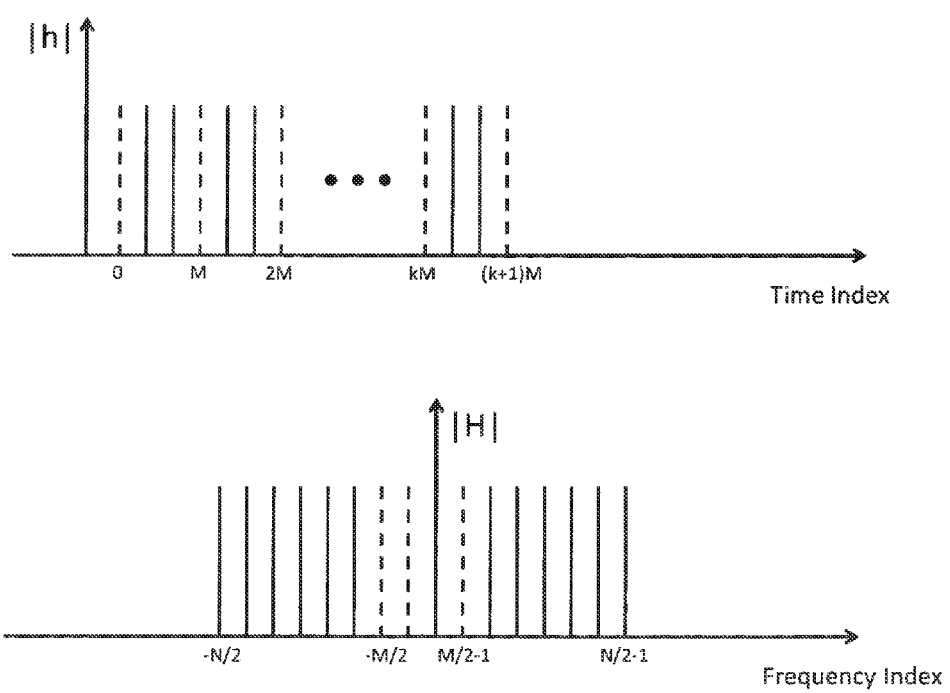
Figure 4:
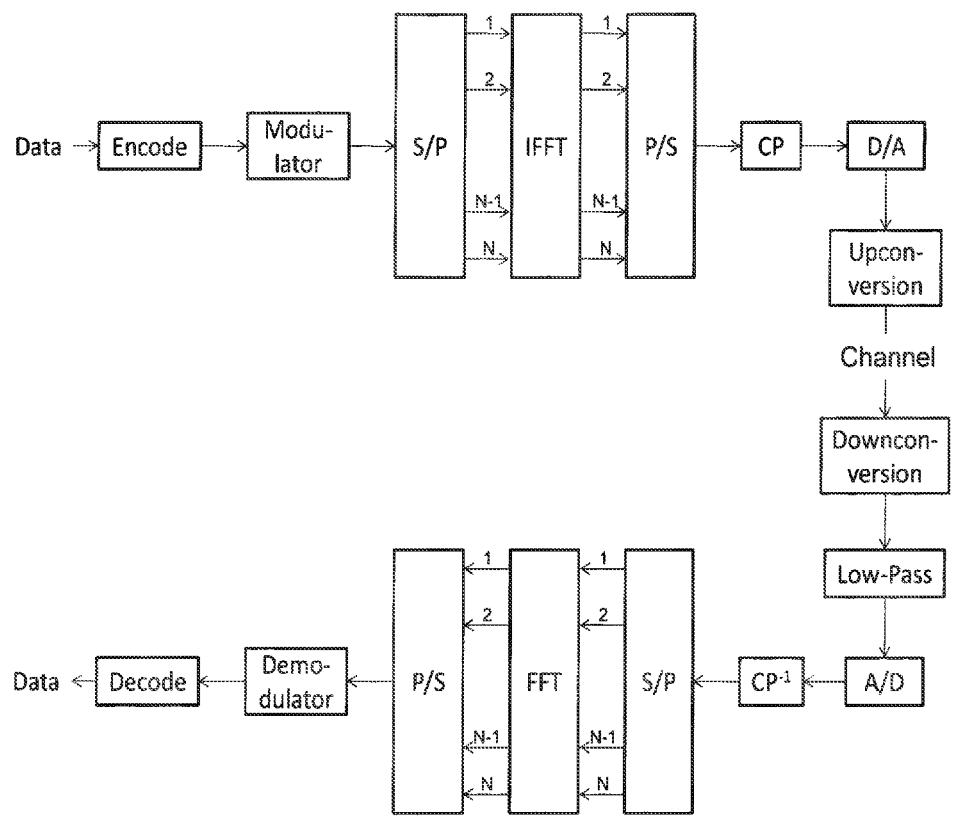
Figure 5:
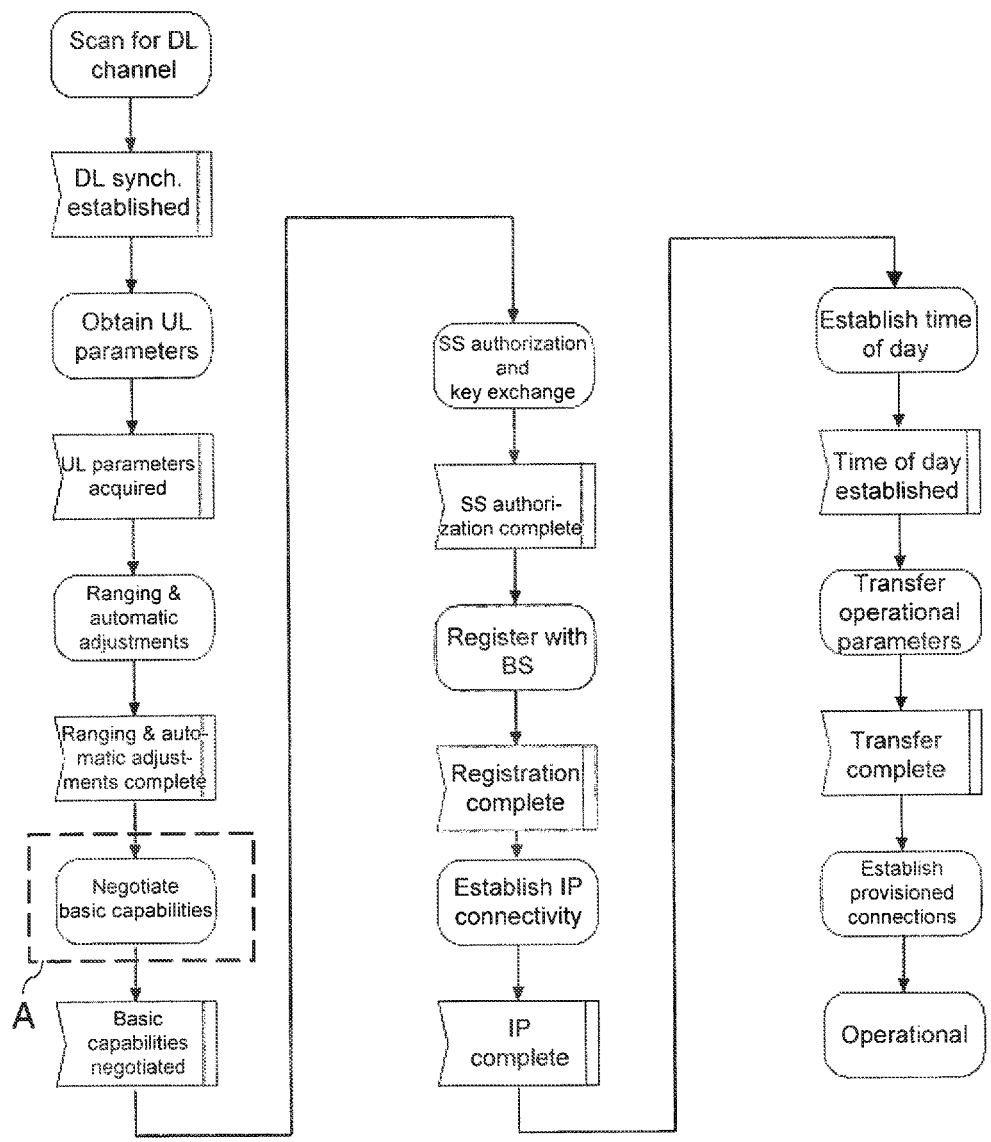
Figure 6:
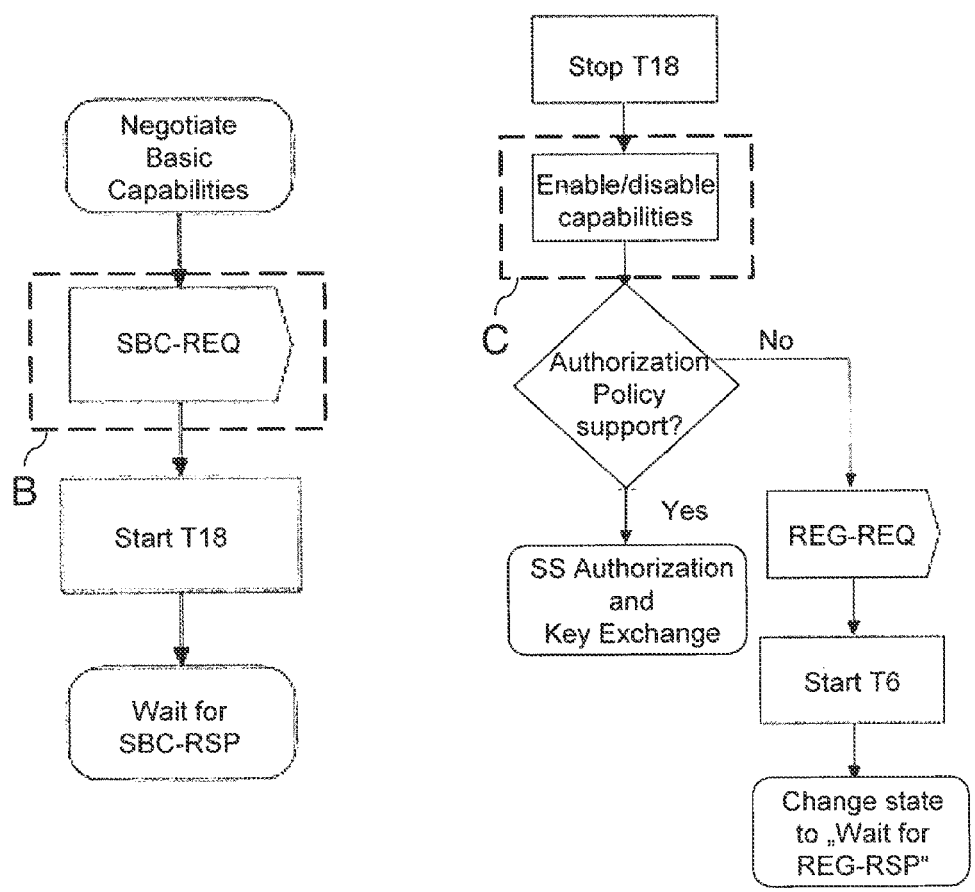

There are several ways how to design and further develop the teaching of the present invention in an advantageous way. To this end, it is to be referred to the patent claims subordinate to independent patent claims 1 and 21 on the one hand, and to the following explanation of a preferred example of an embodiment of the invention illustrated by the drawing on the other hand. In connection with the explanation of the preferred examples of an embodiment of the invention by the aid of the drawing, generally preferred embodiments and further developments of the teaching will be explained. In the drawings FIG. 1 is a diagram illustrating time and frequency representation of an OFDMA signal according to prior art, FIG. 2 is a diagram illustrating time and frequency representation of an OFDMA subsystem according to an embodiment of the present invention, FIG. 3 is a diagram illustrating the partitioning of an OFDMA system in K subsystems according to a further embodiment of the present invention, FIG. 4 is a block diagram illustrating a transceiver chain in an OFDMA system according to prior art, FIG. 5 is a diagram illustrating an initialization process of a receiver in an OFDMA system according to an embodiment of the present invention, and FIG. 6 is a diagram illustrating the negotiation process of basic capabilities between a receiver and the transmitter in an OFDMA system according to an embodiment of the present invention.

DETAILED DESCRIPTION OF THE INVENTION

Although the present invention is in general applicable to any multi-carrier system, the following description of preferred embodiments of the present invention relates to an OFDMA (Orthogonal Frequency Division Multiplex Access) based system, like an MRN (Mobile Radio Network), with bandwidth B and OFDM symbol length T. The upper diagram of FIG. 1 is a time representation of a typical OFDMA signal with amplitude |h|. In the time domain subcarriers are placed within a time distance of 1/B between each other. The lower diagram of FIG. 1 relates to the same OFDMA signal as in the upper diagram, however, this time illustrated in the frequency domain. Subcarriers are placed within a frequency distance of 1/T between each other. The spacing 1/T is referred to in the following as subcarrier spacing. Overall N=BT subcarriers exist in an OFDMA system as illustrated in FIG. 1.

Figure 3:
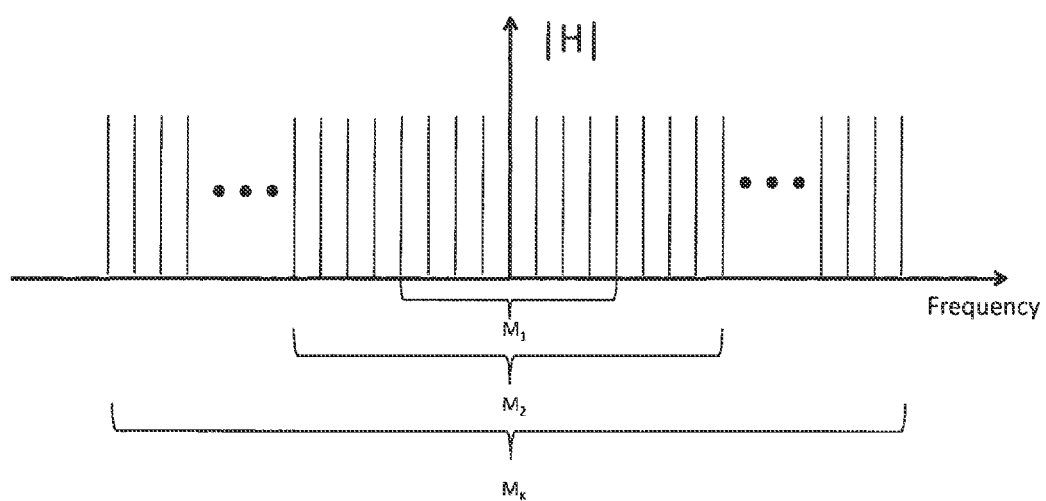

According to an embodiment of the present invention the frequency band is hierarchically organized such that it is partitioned in K classes as illustrated in FIG. 3. In the following these classes are referred to as receiver classes. Each receiver class $1 < k < K$ uses the first (or inner-most) $M_k$ subcarriers around the carrier frequency $f_c$, where $M_1 < M_2 < \ldots < M_K$. Each $M_K$ is a power of 2. Each receiver terminal belonging to receiver class k only obtains overall $M_k$ samples, i.e., it only acquires every $N/M_K$-th sample of the transmitted OFDMA signal. This is indicated in FIG. 2 by the dashed lines. The $M_K$ samples are used to reconstruct the first $M_K$ subcarriers of the frequency domain signal. This is possible as the vector of time samples obtained in steps of $N/M_K$ possible time samples suffices to reconstruct the inner-most $M_K$ subcarriers.

The hierarchical approach allows for a multitude of terminals with different requirements on the detector and decoder complexity, which linearly increase with the number of time samples. In addition, the analog-to-digital conversion (ADC) as well as the Fast-Fourier-Transform (FFT) consume a major part of the receiver energy. Since the receiver only needs to acquire $M_K/N$ of all time samples of the N-length OFDM system, the complexity related to Analog-Digital-Conversion (ADC) and Fast Fourier Transform (FFT) is reduced by factors $N/M_K$ and $N*\log(N)/M_K*\log(M_K)$, respectively (see for reference Cooley et al., 1965, "Algorithm for the machine calculation of complex Fourier series," Math. Comput. 19: 297-301).

FIG. 4 is a block diagram of a typical OFDM system and it schematically illustrates the transceiver chain of general OFDMA transmitters and receivers. As can be obtained from FIG. 4, the data to be transmitted is fed into an encoder, such as a convolution encoder. The encoder forwards encoded bits to a modulator, such as an M-QAM (Multi-Level Quadrature Amplitude Modulator). The modulator maps the received bits to constellation points, which are then parallelized by means of an S/P converter and transformed to the time domain by means of an IFFT (Inverse Fast Fourier Transformation). As will be apparent to a skilled person, both encoder and modulator can also be placed after the S/P converter such that N parallel modulators/encoders are deployed.

The output of the IFFT is then serialized by means of an P/S converter. In a next step a cyclic prefix is appended. Alternatively, a cyclic prefix may be prepended, or a guard interval may be included. Finally, the resulting time domain sequence is converted from digital to analogue domain, up-converted to the carrier frequency, and finally transmitted through a wireless channel (or wireline in case of DSL). The signal then received is down-converted and filtered by a low-pass filter. After low-pass filtering the signal is converted from analogue to digital domain, the cyclic prefix is removed, and the digital time domain signal is parallelized. The parallel signal is then transformed to frequency domain using an FFT (Fast Fourier Transformation), which in general is a DFT (Discrete Fourier Transformation). The signal obtained thereby is afterwards again serialized, demodulated and decoded. The last two steps—demodulation and decoding—might be executed in a loop as it is done in a turbo-decoder.

As already mentioned above, the focus of the present invention is the downlink in M2M communication where the base station takes up the role of the transmitter and the mobile terminal takes up the role of the receiver. Although the invention can easily be applied to a system's uplink, its energy-saving and complexity-reduction abilities are of particular interest in the downlink where the mobile terminal is energy-limited and must cope with low-complex and cheap hardware. This, however, does not preclude that the present invention is also applied to the uplink.

Terminals within one receiver class can be optimized for a particular service such as metering or observation and therefore they are underlying a specific objective. As a result the DFT size employed by each receiver class differs and a terminal within one receiver class not necessarily must exploit all available subcarriers within its receiver class. A terminal rather can negotiate with its assigned base station BS how many subcarriers will actually be occupied. This negotiation can be done using a BS's broadcast channel, which informs about the BS abilities (for instance whether a transmission only within a limited set of subcarriers is supported). The signaling and controlling must then be included in those subcarriers, which are detectable by all terminals. The actual negotiation about the used subcarriers can be included in a system's standard process to negotiate a UE's (User Equipment) abilities. For instance in IEEE 802.16m, a SBC (Supported Basic Capabilities)-REQ message is transmitted by the UE.

The processes of initialization of a UE at a BS and negotiation of basic capabilities are illustrated in FIGS. 5 and 6 for the case of IEEE 802.16. The steps where adaptations of the current standard are required are indicated by a dashed line box. For instance, in the step "Negotiate basic capabilities" of the initialization process illustrated in FIG. 5 a change is required, which is indicated by box A. Using this step the UE and the BS negotiate which subcarriers are supported. In a specific implementation the negotiation of subcarrier support may be realized by introducing an additional flag or bit (e.g. for exchanging a binary information). Further adaptations are illustrated in FIG. 6 indicated by boxes B and C. As indicated by box B, the SBC-REQ message UEs send to their serving BS is changed in such a way that it includes the information on the supported subcarrier set. Furthermore, as indicated by box C the step "enable/disable capabilities" is employed for informing the UE whether it is allowed to use a certain subcarrier set only. Generally it is to be noted that the additional flexibility to negotiate the used subcarriers allows for further energy savings at the UE/terminal and a simpler classification of UEs/terminals.

The transmitter and receiver can use the same standardized Modulation-and-Coding-Schemes (MCSs) as they are defined for the remaining system according to current standards. In addition, the standard transceiver chain is implemented. However, the receiver must inform the transmitter that it is only operating on a restricted set of subcarriers, which implies additional signaling between both nodes.

The transmitter accommodates the additional receiver classes in its scheduling algorithms due to the restricted assignment of resources and the inability to spread logical subcarriers over the complete spectrum. In addition, the scheduler may consider long-term objectives and requirements. For instance, a terminal, which can cope with high latency and high delays, needs not to be scheduled during high-traffic times, e.g. metering data during day times should be avoided as the spectrum will be required to satisfy the high data-rate demands of cell phone users.

A legacy implementation could embed the information related to a class k in those resources, which are otherwise used for data transmission by the system. Synchronization is still possible as preambles and pilots are distributed over all frequency resources and are therefore usable also by lower receiver classes. After synchronization, a M2M receiver might receive all the related information in those resources, which are otherwise used for data transmission by the system. Nonetheless, this is not an optimal solution as partly redundant information is sent for conventional receivers and M2M nodes.

Examples for a legacy implementation are 3GPP LTE, IEEE 802.16, and IEEE 802.11, which rely on OFDM (at least in the downlink) and (will be) widely deployed. These systems could embed an additional M2M service such that existing deployments offer the possibility for M2M communication after a software update (instead of costly hardware updates).

In order to avoid redundancy in the signaling and controlling structure, future systems may be adjusted such that their signaling and controlling information is hierarchically organized. This implies for instance that the physical to logical resource mapping is affected, as all information related to receiver class k must be contained in the first $M_K$ subcarriers. In addition, the permutation of distributed resource units is affected and should be limited to the first $M_K$ subcarriers. An example implementation could be composed of two classes where class 0 is used for the M2M communication. An implementation could adjust the PRU (Physical Resource Unit) assignment for instance in IEEE 802.16 such that the first $M_0$ subcarriers are part of the miniband partition. Within this miniband partition a frequency partition is created, which includes all $M_0$ subcarriers. Within this frequency partition now the complete signaling and controlling data for class 0 can be transmitted.

Alternatively, the permutation could remain unaffected, which requires a very selective assignment of controlling/signaling messages to resource units and therefore a change of the signaling/controlling structure. A further possibility is to define M2M time zones, in which the M2M device switches to low-rate sampling mode. For reception of certain broadcasted system parameters, depending on the technology, the M2M has to switch to the standard sampling rate.

As has been discussed above, communication with energy-limited receivers not only impacts the receiver but also the transmitter design. The present invention, however, relates to minimal changes at the transmitter, which will be most likely software updates at base stations, in order to avoid costly hardware updates, and it relates to new low-complexity receiver hardware, which allows for more energy-efficient operation (mainly energy-limited mobile terminals), resulting in an increased lifetime of energy-limited nodes.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A communication network, comprising:
    a plurality of communication elements that function as transmitters, receivers, base stations, and operating nodes being associated to at least one of said base stations,
    wherein communication between said transmitters and said receivers is performed by generating and transmitting signals based on a multi-carrier modulation with a number of N subcarriers around a carrier frequency $f_c$,
    wherein said communication elements are configured to perform, upon receiving a transmitted signal, a sub-sampling of the received signal,
    wherein only a predetermined number of inner-most subcarriers around said carrier frequency $f_c$ are employed for data reconstruction,
    wherein the predetermined number of inner-most subcarriers around said carrier frequency $f_c$ employed for data reconstruction, define an employed frequency band that is partitioned into a predetermined number K of receiver classes, and
    wherein one of said receivers informs said transmitters of a specific receiver class (k), from said predetermined number K of receiver classes, in which said one receiver operates.

2. The network according to claim 1, wherein said multi-carrier modulation is implemented as Orthogonal Frequency Division Multiplex Access (OFDMA).

3. The network according to claim 1, wherein each of said receiver classes 1<k<K spans a number $M_k$ of the inner-most subcarriers around said carrier frequency $f_c$.

4. The network according to claim 1, wherein said one receiver that operates in said specific receiver class (k) is configured to perform the sub-sampling of received signals by acquiring only every $N/M_k$-th sample of a transmitted signal.

5. The network according to claim 1, wherein said specific receiver class (k) is in form of a class ID.

6. The network according to claim 1, wherein said transmitters accommodate existing receiver classes in their scheduling algorithms.

7. The network according to claim 1, wherein the employed frequency band is partitioned into two receiver classes 0 and 1.

8. The network according to claim 1, wherein receivers of receiver class k are configured to apply a low-pass filter for the first $M_k$ subcarriers of received signals.

9. The network according to claim 1, wherein said transmitters perform a precoding of transmitted signals.

10. The network according to claim 1, wherein said transmitters employ guard intervals or power control techniques.

11. The network according to claim 1, wherein signaling or control information is hierarchically organized.

12. The network according to claim 1, wherein one said transmitter transmits signaling or control information in one or more subcarriers that are outside a lowest existing receiver class.

13. The network according to claim 12, wherein said signaling or control information is transmitted in a TDMA manner.

14. The network according to claim 1, wherein said receivers are equipped with means that enable said receivers to switch between different sampling rates at predefined or signaled time instances.

15. A communication network, comprising:
a plurality of communication elements that function as transmitters, receivers, base stations, and operating nodes being associated to at least one of said base stations, wherein communication between said transmitters and said receivers is performed by generating and transmitting signals based on a multi-carrier modulation with a number of N subcarriers around a carrier frequency $f_c$,
wherein said communication elements are configured to perform, upon receiving a transmitted signal, a sub-sampling of the received signal,
wherein only a predetermined number of inner-most subcarriers around said carrier frequency $f_c$ are employed for data reconstruction,
wherein the predetermined number of inner-most subcarriers around said carrier frequency $f_c$ employed for data reconstruction, define an employed frequency band that is partitioned into a predetermined number K of receiver classes,
wherein said operating nodes are grouped depending on their complexity or capabilities, and
wherein the operating nodes of a specific group operate by using a specific receiver class.

16. The network according to claim 15, wherein each of said receivers operates in a specific receiver class k.

17. A communication network, comprising:
a plurality of communication elements that function as transmitters, receivers, base stations, and operating nodes being associated to at least one of said base stations, wherein communication between said transmitters and said receivers is performed by generating and transmitting signals based on a multi-carrier modulation with a number of N subcarriers around a carrier frequency $f_c$,
wherein said communication elements are configured to perform, upon receiving a transmitted signal, a sub-sampling of the received signal,
wherein only a predetermined number of inner-most subcarriers around said carrier frequency $f_c$ are employed for data reconstruction,
wherein the employed frequency band is partitioned into two receiver classes 0 and 1,
wherein said receiver class 0 is employed by energy-limited M2M operating nodes, and
wherein said receiver class 1 is employed by other mobile communication nodes.

18. The network according to claim 17, wherein said energy-limited M2M operating nodes of receiver class 0 are configured to perform a sub-sampling of received signals, and wherein other mobile communication nodes are configured to acquire each sample of received signals.

19. The network according to claim 17, wherein the predetermined number of inner-most subcarriers around said carrier frequency $f_c$ employed for data reconstruction, define an employed frequency band that is partitioned into a predetermined number K of receiver classes.

* * * * *